(12) United States Patent
Salami et al.

(10) Patent No.: US 9,686,691 B2
(45) Date of Patent: Jun. 20, 2017

(54) CLASSIFICATION OF A BASESTATION

(71) Applicant: UBIQUISYS LIMITED, Swindon (GB)

(72) Inventors: Gbenga Salami, Swindon (GB); Sandro Grech, Bath (GB); Simon Burley, Swindon (GB)

(73) Assignee: UBIQUISYS LIMITED, Swindon, Wiltshire (GB)

( * ) Notice: Subject to any disclaimer, the term of this patent is extended or adjusted under 35 U.S.C. 154(b) by 104 days.

(21) Appl. No.: 14/325,116

(22) Filed: Jul. 7, 2014

(65) Prior Publication Data

US 2015/0017994 A1    Jan. 15, 2015

(30) Foreign Application Priority Data

Jul. 12, 2013 (GB) .................................. 1312506.7

(51) Int. Cl.
*H04W 40/00* (2009.01)
*H04W 16/20* (2009.01)
(Continued)

(52) U.S. Cl.
CPC .......... *H04W 16/20* (2013.01); *H04W 48/12* (2013.01); *H04W 84/045* (2013.01)

(58) Field of Classification Search
CPC ... H04W 84/045; H04W 24/02; H04W 36/14; H04W 16/10; H04W 16/18; H04W 16/32;
(Continued)

(56) References Cited

U.S. PATENT DOCUMENTS

2006/0193284 A1* 8/2006 Stieglitz .............. H04L 63/0492
370/328
2008/0188265 A1* 8/2008 Carter ................. H04W 52/346
455/561
(Continued)

FOREIGN PATENT DOCUMENTS

EP        2079263       7/2009
EP        2320693       5/2011
(Continued)

OTHER PUBLICATIONS

UKIPO Jan. 13, 2014 Search Report from Application Serial No. GB1312506.7; 3 pages.
(Continued)

*Primary Examiner* — German J Viana Di Prisco
(74) *Attorney, Agent, or Firm* — Patent Capital Group (57) ABSTRACT

In one example embodiment, a method for classifying a basestation in a cellular communications network is provided that may include obtaining an identifier used by the basestation, comparing the identifier to a pool of identifiers reserved for a class of basestations, obtaining a frequency on which the basestation is operating, comparing the frequency to a pool of frequencies used by the class of basestations, and identifying the basestation as belonging to the class of basestations if the identifier is in the pool of identifiers and the frequency is in the pool of frequencies. Another method for classifying a basestation may comprise receiving a broadcast from the basestation including an attribute of the basestation, comparing the attribute with an attribute value range corresponding to the class of basestations, and identifying the basestation as belonging to the class of basestations if the received cell attribute falls within the attribute value range.

20 Claims, 6 Drawing Sheets

(51) Int. Cl.
*H04W 48/12* (2009.01)
*H04W 84/04* (2009.01)

(58) Field of Classification Search
CPC ............. H04W 24/10; H04W 36/0061; H04W 36/0072; H04W 36/0083; H04W 36/026; H04W 36/04; H04W 36/245; H04W 36/30; H04W 48/08
USPC ............ 455/422.1, 443, 444, 524, 525, 561, 455/562.1
See application file for complete search history.

(56) References Cited

U.S. PATENT DOCUMENTS

| | | | | |
|---|---|---|---|---|
| 2009/0129291 A1* | 5/2009 | Gupta | .................... | H04W 8/26 370/254 |
| 2009/0129338 A1* | 5/2009 | Horn | .................... | H04W 48/10 370/331 |
| 2009/0135784 A1* | 5/2009 | Horn | ................. | H04W 36/0055 370/331 |
| 2009/0247157 A1* | 10/2009 | Yoon | .................... | H04W 48/16 455/434 |
| 2011/0143755 A1* | 6/2011 | Islam | .................... | H04W 48/12 455/434 |
| 2011/0171915 A1* | 7/2011 | Gomes | .................. | H04W 24/10 455/73 |
| 2013/0029667 A1* | 1/2013 | Zhu | ........................ | H04W 36/08 455/438 |
| 2013/0157652 A1* | 6/2013 | Khaitan | ................ | H04W 52/16 455/422.1 |
| 2013/0237227 A1* | 9/2013 | Nagaraja | .............. | H04W 16/10 455/436 |
| 2013/0252602 A1* | 9/2013 | Meshkati | .............. | H04W 24/02 455/422.1 |

FOREIGN PATENT DOCUMENTS

| | | |
|---|---|---|
| GB | 2447439 | 9/2008 |
| GB | 2498527 | 7/2013 |
| GB | 2516105 | 1/2015 |
| WO | 2009/026036 | 2/2009 |

OTHER PUBLICATIONS

"ETSI TR 125 967 V11.0.0 (Oct. 2012) Technical Report: Universal Mobile Telecommunications Systems (UMTS); Home Node B (HNB) Radio Frequency (RF) requirements (FDD) (3GPP TR 25.967 version 11.0.0 Release 11)," ETSI, European Telecommunications Standards Institute 2012, 650 Route des Lucioles, F-06921 Sophia Antipolis Cedex—France, Oct. 2012; 56 pages.

* cited by examiner

CLASSIFICATION OF A BASESTATION

CROSS-REFERENCE TO RELATED APPLICATION

This application claims priority from the patent application filed in the United Kingdom on 12 Jul. 2013, having Application Serial No. GB 1312506.7, entitled "CLASSIFICATION OF A BASESTATION," the contents of which is hereby incorporated by reference in its entirety.

TECHNICAL FIELD

This disclosure relates in general to a basestation for use in a cellular mobile communications network, and to a method for classifying a basestation within a cellular communications network.

BACKGROUND

Small cell basestations are known and used in many cellular networks. A small cell basestation connects to the core network of a network operator and provides network coverage for subscribers over a coverage area of the cell. Small cell basestations are intended to complement existing macro layer coverage, providing mobile network access in areas where such access is problematic. Common deployment sites for small cell basestations include residential and business premises as well as rural outdoor areas.

Small cell basestations are typically intended to run autonomously, and thus have many self-configuration properties. On startup, for example, a small cell basestation will typically select a physical layer identifier to use while in service, so allowing user equipment devices (UEs) to identify signals transmitted from the small cell basestation. Examples of physical layer identifiers include Primary Scrambling Codes (PSCs) in UMTS (Universal Mobile Telecommunications System) and Physical Layer Cell Identities (PCIS) in LTE (Long Term Evolution). As part of the startup process, the small cell basestation investigates the radio frequency environment of its deployment situation, searching for neighboring basestations and their physical layer identifiers. This investigation may take the form of a radio environment scan or Network Listen (NWL). Identifying neighboring basestations may assist not only in selecting a suitable physical layer identifier for the small cell basestation but also in determining suitable Radio Resource Management (RRM) policies to be adopted with respect to the neighbor basestations.

BRIEF DESCRIPTION OF THE DRAWINGS

For a better understanding of the present disclosure, and to show more clearly how it may be put into effect, reference will now be made, by way of example, to the accompanying drawings, in which.

DETAILED DESCRIPTION OF EXAMPLE EMBODIMENTS

Overview

In one example embodiment, a method for classifying a basestation in a cellular communications network is provided that may include obtaining an identifier used by the basestation, comparing the identifier to a pool of identifiers reserved for a class of basestations, obtaining a frequency on which the basestation is operating, comparing the frequency to a pool of frequencies used by the class of basestations, and identifying the basestation as belonging to the class of basestations if the identifier is in the pool of identifiers and the frequency is in the pool of frequencies. Another method for classifying a basestation may comprise receiving a broadcast from the basestation including an attribute of the basestation, comparing the attribute with an attribute value range corresponding to the class of basestations, and identifying the basestation as belonging to the class of basestations if the received cell attribute falls within the attribute value range.

EXAMPLE EMBODIMENTS

Aspects of the present disclosure are described below with reference to processes carried out at a small cell basestation. However, it will be appreciated that this is for illustrative purposes only. The methods and apparatus provided by the present disclosure may be applied in any basestation unit having a degree of auto-configuration functionality, including but not limited to macro layer basestations, femtocells, micro basestations, pico basestations etc. Similarly, references in the following description to cellular communications networks operating according to the UMTS standard are for illustrative purposes only, the methods and apparatus of the present disclosure being equally applicable to networks operating according to other standards including for example LTE.

One factor in determining RRM policies is the nature or type of neighboring basestations. The formation of correct neighbor lists and setting of downlink and uplink power limits are affected by whether neighboring basestations form part of the macro or small cell layer, as well as other basestation attributes.

According to current operating specifications, a basestation may classify its neighbors as small cells or non-small cells (typically assumed to be macro cells) as part of the process of selecting a physical layer identifier. In 3GPP TR25.967 (sub clause 7.4.1 Scrambling Code Selection), the process of selecting a PSC in UMTS is described as set out below. In the terminology of the TR, a small cell basestation is referred to as a Home NodeB or HNB, this term covering any basestation that falls into the 3GPP Home and Local Area BTS class from a maximum output power perspective.

"Depending on the HNB deployment strategy, a certain set of scrambling codes can be reserved for HNBs, denoted as $S_{HNB} = \{S_1, S_2, \ldots, S_{Nsc}\}$. If the HNBs operate on a dedicated carrier, the HNB can scan all the available scrambling codes (i.e., $N_{sc}=512$) and the total number of scrambling codes that can be reserved for HNBs is configurable. If HNBs operate on a shared carrier (co-channel) with macrocell, a certain subset of available scrambling codes should be reserved for HNBs and these codes should not be used by any macrocell base station.

During HNB self-configuration, HNB scans for all scrambling codes and constructs a set of scrambling codes which have pilot energy above detection threshold: $S_{DETECTED} = \{S_i, S_j, \ldots, S_k\}$. Note that some of the scrambling codes in the set $S_{DETECTED}$ can be part of the set $S_{HNB}$ (i.e., PSCs used by neighboring HNBs) and rest of the set can be part of "macrocell only" scrambling codes. Then, HNB can select the "best" scrambling code based on certain criteria, for example:

If all HNB-reserved scrambling codes are being used by neighbor HNBs
HNB picks a scrambling code in $S_{HNB}$ with smallest amount of detected energy (i.e., smallest CPICH Ec/No and CPICH RSCP)
Else
HNB picks a scrambling code randomly from set of scrambling codes that are member of $S_{HNB}$ but not member of $S_{DETECTED}$ Upon failure to pick the "best" scrambling code, an alarm or some form of error indication can be sent to the network controller (e.g. Core Network, HNB-GW, O&M server)."

The above-described approach may also be extended to the selection of a suitable LTE PCI for small cell basestation use.

Where a dedicated pool of PSCs or PC's is assigned for small cell basestation use, a basestation can classify neighboring cells detected through network listen methods as small cells or macro cells, based on the neighbor's physical layer identifier. Neighbor basestations identified in measurements received from connected User Equipment devices (UEs) may also be classified in this way.

Classifying neighbor basestations as described above assists in the formation of neighbor lists and adoption of appropriate RRM policies. However, misclassification can occur, particularly in the case of neighbor basestations that are part of a different PLMN (Public Land Mobile Network) to the small cell basestation conducting the classification.

According to an aspect of the present disclosure, there is provided a method for classifying a basestation in a cellular communications network; comprising obtaining an identifier used by the basestation; comparing the identifier to a pool of identifiers reserved for a class of basestations; obtaining a frequency on which the basestation is operating; comparing the frequency to a pool of frequencies used by the class of basestations; and identifying the basestation as belonging to the class of basestations if the identifier is in the pool of identifiers and the frequency is in the pool of frequencies.

According to another aspect of the present disclosure, there is provided a method for classifying a basestation in a cellular communications network; comprising receiving a broadcast from the basestation including an attribute of the basestation; comparing the attribute with an attribute range corresponding to the class of basestations; and identifying the basestation as belonging to the class of basestations if the received cell attribute falls within the attribute range.

According to another aspect of the present disclosure, there is provided a method for classifying a basestation in a cellular communications network; comprising receiving a message from the basestation; analyzing the message content; and identifying the basestation as belonging to a class of basestations based on the message content. Each of the first, second or third aspects of the present disclosure may be employed independently or in combination, as discussed in further detail below. According to another aspect of the present disclosure, there is provided a basestation configured to carry out a method according to the first second or third aspects.

Figure 1:
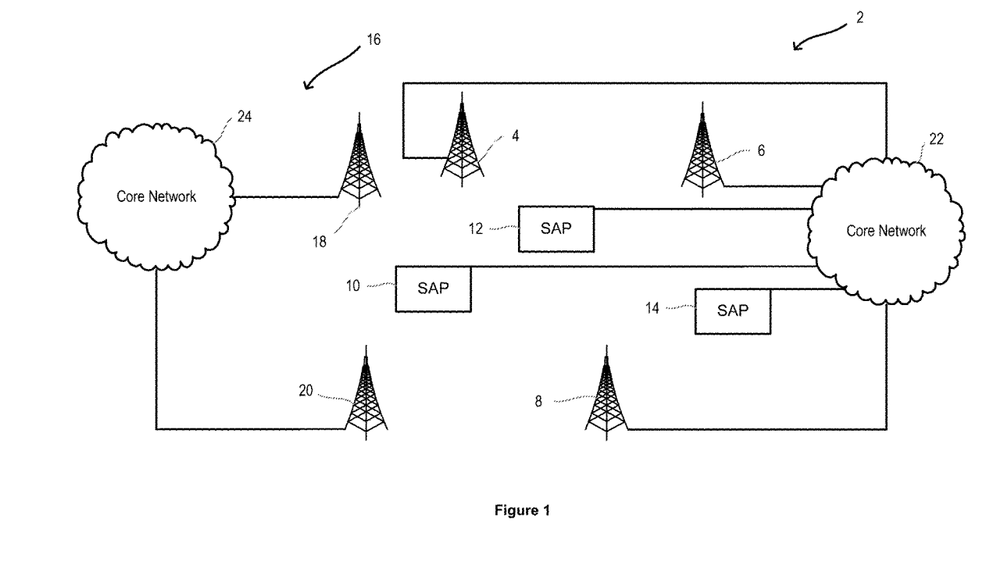
FIG. 1 is a schematic illustration of basestations in two cellular communications networks.

FIG. 1 illustrates a part of two different cellular communications networks, each comprising a plurality of basestations. A first cellular network 2 comprises macro layer basestations 4, 6, and 8 and small cell basestations or access points (SAPs) 10, 12 and 14. A second cellular network 16 comprises macro layer basestations 18 and 20. It will be appreciated that each of the cellular networks 2, 16 may include many more macro layer and small cell basestations, but the present disclosure can be described sufficiently without illustrating additional basestations.

The macro basestations and small cell basestations communicate over wired or wireless backhaul links with the core network 22, 24 of their respective cellular networks. The macro basestations and small cell basestations also communicate with user equipment devices (UEs) via wireless links. The small cell basestations 10, 12 and 14 may be deployed on a dedicated small cell carrier channel, be deployed co channel with one or more of the macro layer basestations 4, 6, 8 in the network 2, or may for example be deployed on a carrier channel which is offset from, and partially overlapping a macro layer carrier channel or channels.

Aspects of the present disclosure provide methods by which a small cell basestation 10 may classify its neighbor basestations 4, 6, 8, 12, 14, 18, and 20.

Figure 2:
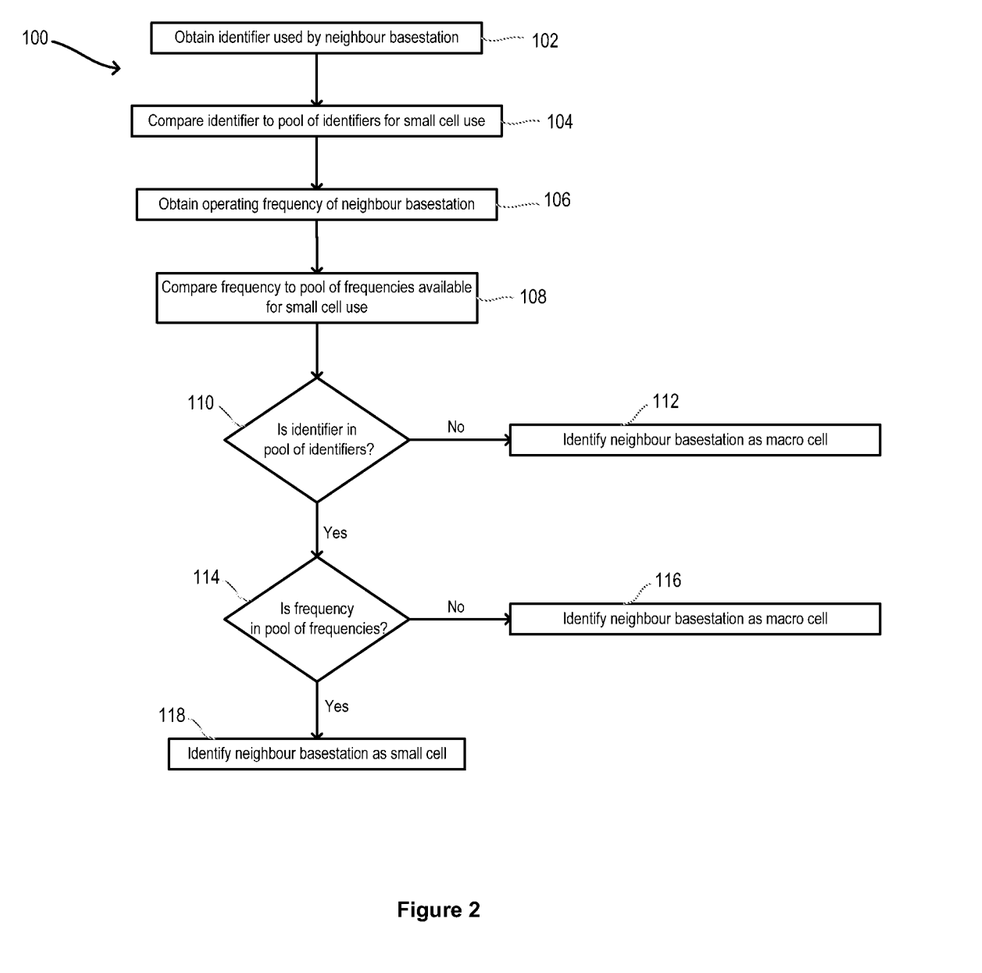
FIG. 2 is a flowchart illustrating steps in a method for classifying a basestation in a cellular communications network.

FIG. 2 is a flowchart illustrating steps in a process 100 according to an embodiment of the present disclosure, by which the small cell basestation 10 may classify its neighbor basestations. The process steps are carried out with respect to a neighbor basestation, which the basestation 10 wishes to classify.

Referring to FIG. 2, in a first step 102 the basestation 10 obtains an identifier used by the neighbor basestation. As discussed above, the identifier may take different forms but in the present example of a UMTS network, the identifier is a primary scrambling code (PSC). The neighbor PSC may be obtained by the basestation 10 as part of a network listen (NWL) or via a measurement report received from a UE connected to the basestation 10. In a step 104, the basestation 10 then compares the identifier obtained in step 102 to a pool of identifiers reserved for small cell basestation use in its network 2. As explained above, network operators may reserve a particular set or pool of available PSCs or PC's expressly for use by small cell basestations. The basestation 10 may receive this pool from the core network as part of the process of selecting its own PSC.

In order to provide increased flexibility, it may be desirable to further subdivide the pool of identifiers reserved for small cell use into smaller subsets. Each subset may then be allocated to a particular deployment area, small cells in the area selecting their identifier from the appropriate subset. Further subdividing the set of identifiers for small cell use in this manner may assist in reducing the likelihood of cell identifier collision and/or confusion. By appropriately allocating the subsets across the small cell layer of the network, the distances over which a cell identifier is reused may be effectively increased.

In networks where the pool of identifiers for small cell use has been further subdivided, the basestation 10 may receive not only the subset of identifiers from which it is to select its own identifier, but also information concerning all other subsets. The basestation 10 may then compare the obtained identifier of the neighbor basestation with the full set of identifiers reserved for small cell use across the network 2 in step 104 of the process. For example, the basestation 10 may receive a first PSC parameter defining the subset of identifiers available to it and an extension to the first PSC parameter defining all additional PSCs, which are available to small cell basestations across the network. The basestation 10 thus has visibility of all PSCs reserved for small cell use in the network. The basestation 10 may select its own PSC from the dedicated subset but may use the complete set for the comparison of step 104.

Referring again to FIG. 2, in a subsequent step 106, the basestation 10 obtains a frequency on which the neighbor basestation is operating. As for the cell identifier, the operating frequency may be obtained through NWL conducted by the basestation 10 or via measurements received from connected UEs. The basestation 10 then compares the obtained frequency to a pool of frequencies available for and used by small cell basestations in step 108. The nature of the pool of frequencies may depend upon the nature of the deployment situation of small cell basestations within the network 2 of the basestation 10. If small cell basestations in the network 2 are deployed on a dedicated clear, or offset carrier channel, then the pool of frequencies may comprise this dedicated channel, which is reserved for small cell basestation use. Alternatively, if small cells in the network are deployed co channel with a macro layer carrier channel, for example a camping or capacity channel, then the pool of frequencies may comprise either or both of the macro channels according to which of the macro channels is available for small cell deployment in the network 2.

In a subsequent step 110 of the process 100, the basestation 10 then assesses whether or not the identifier obtained in step 102 was found to be included within the pool of identifiers in the comparison step 104. If the identifier was not among the pool of identifiers reserved for small cell use (No in step 110), the basestation 10 classifies the neighbor basestation under consideration as a macro layer cell in step 112. If the identifier was among the pool of identifiers reserved for small cell use (Yes in step 110), the basestation 10 proceeds to step 114 and assesses whether or not the frequency obtained in step 106 was found to be included within the pool of frequencies available for small cell use in the comparison step 108. If the frequency was not among the pool of frequencies (No in step 114), the basestation 10 classifies the neighbor basestation under consideration as a macro layer cell in step 116. If the frequency was among the pool of frequencies available for small cell use (Yes in step 114), the basestation 10 classifies the neighbor basestation as a small cell basestation in the network 2, in step 118.

Following the classification of the neighbor basestation in step 112, 116 or 118, the basestation 10 may proceed to repeat the steps of the process 100 for other neighbor basestations, until all detected neighbor basestations have been classified. The basestation 10 is then equipped to adopt suitable RRM policies according to the type and number of neighbors in its environment and the observed radio conditions.

Owing to the ways in which NWL attributes may be configured, it is possible for a small cell basestation to perform NWL over a wide range of PLMNs and frequency bands. It is therefore possible that the basestation 10 may perform NWL over frequencies that belong to other operators; including for example the operator of the network 16, whose basestations 18 and 20 are neighbors of basestation 10. The basestations 18 and 20 would therefore be detected by the NWL of the basestation 10 and would be considered for classification. The pool of identifiers reserved for small cell use and considered in the comparison of step 104 is particular to the network 2 of basestation 10, and may not be replicated in the network 16 of basestations 18 and 20. It may therefore be that one or both of the macro basestations 18, 20 of the network 16 is using an identifier that in the network 2 of the basestation 10 is reserved for small cell use. If the classification of neighbor basestations were based solely on identifier, as were the case in the approach described above, such a neighbor macro basestation would be misclassified as a small cell. This misclassification would impact upon the neighbor list formation and could lead to a wrong neighbor association and a consequent reduction in the handover success rate of the network. By basing the classification of the neighbor basestation on both the identifier and the frequency of the neighbor basestation, the process of FIG. 2 avoids such misclassification.

Figure 3A:
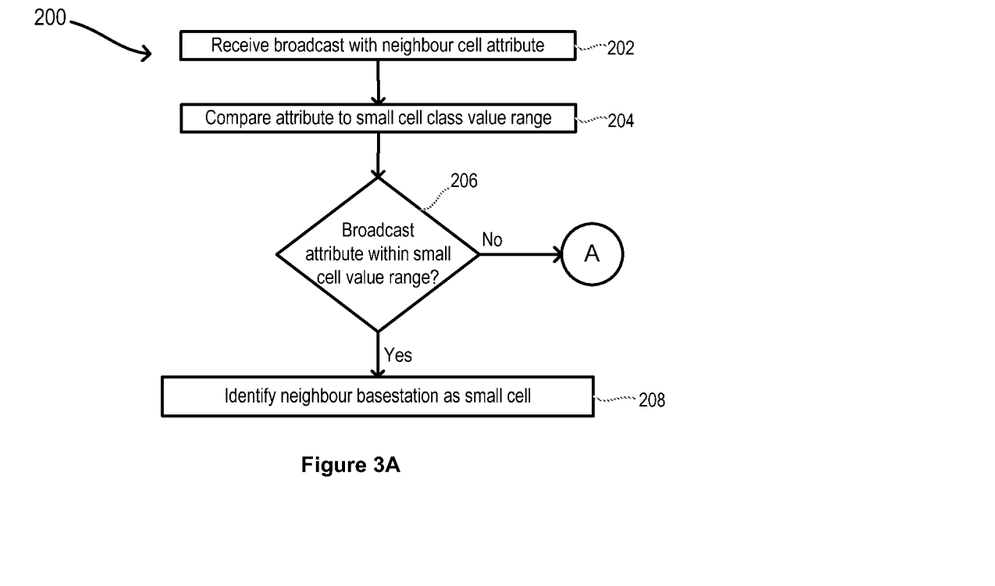
FIGS. 3A and 3B are flowcharts illustrating steps in another method for classifying a basestation in a cellular communications network.

FIG. 3A is a flowchart illustrating steps in a process 200 according to another embodiment of the present disclosure, by which the small cell basestation 10 may classify its neighbor basestations. As previously, the process steps are carried out with respect to a neighbor basestation, which the basestation 10 wishes to classify.

Referring to FIG. 3A, in a first step 202, the basestation 10 receives a broadcast from the neighbor cell including a cell attribute of the neighbor cell. The cell attribute may for example be the common channel power setting for the neighbor cell. This information is included in specific System Information Blocks (SIBs) broadcast by each basestation. Having received the broadcast, the basestation 10 then proceeds to step 204, in which the basestation compares the received attribute of the neighbor cell with a value range for the cell attribute corresponding to a class of basestations.

The 3GPP technical specifications define a range of different basestation classes including but not limited to small cell basestations. The classes can be defined according to attributes of the basestation concerned and include Home, Local Area, Medium Area, and Wide Area. As noted above, small cell basestations may be considered to comprise all basestations falling within the Home or Local Area basestation classes as defined by the 3GPP. Macro layer basestations may include basestations falling into the Medium and Wide Area classes. One cell attribute used to define basestation classes in the 3GPP is the advertised beacon signal power for the basestation that is the power on the P-CPICH in UMTS or the CRS in LTE. Value ranges for this common channel power setting may therefore be defined corresponding to each of the different basestation classes, and these value ranges may be communicated or pre-programmed into the basestation 10 to enable a comparison at step 204 of the illustrated method. The attribute value range with which the basestation 10 compares the received cell attribute is, in the illustrated example, an attribute value range corresponding to a small cell basestation.

Having compared the received cell attribute with the attribute value range, the basestation 10 then proceeds, in step 206 to assess whether or not the value for the received attribute was found to fall within the attribute value range with which it was compared. If the attribute was not in the attribute value range (No at step 206), the basestation 10 follows subsequent steps as detailed in FIG. 3B and discussed below. If the attribute was found to fall within the attribute value range, (Yes at step 206), the basestation 10 classifies the neighbor cell as a small cell in step 208.

Figure 3B:
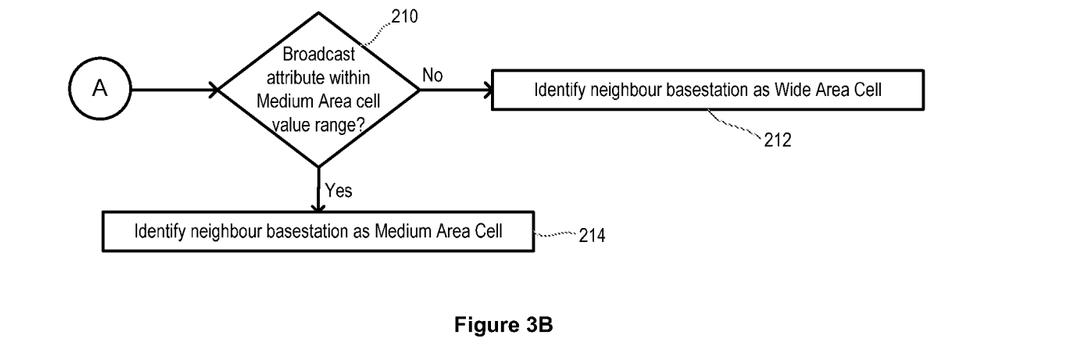

FIG. 3B illustrates steps, which may be conducted as part of the process 200 in the event that the received cell attribute was found not to fall within the value range compared at step 204. In one example, the basestation may simply proceed to classify the neighbor cell as a macro cell, continuing the example of a comparison attribute value range corresponding to small cell basestations. However, in an alternative example illustrated in FIG. 3B, the basestation 10 may proceed in step 210 to assess whether or not the attribute falls within an attribute value range corresponding to another class of basestations, in the present example, Medium Area basestations. If the attribute falls within the Medium Area cell attribute value range (Yes at step 210), the basestation 10 classifies the neighbor cell as a Medium Area cell in step 214. If the attribute does not fall within the Medium Area cell attribute value range (No at step 210), the basestation 10 classifies the neighbor cell as a Wide Area cell in step 212.

The steps of FIG. 3B may be followed in the event that the basestation 10 has received or been pre-programmed with additional attribute value ranges corresponding to other classes of basestation. In some examples, the method 200 may include a checking to determine after a negative result at step 206 whether additional attribute value ranges are available, and hence whether further comparison steps are possible.

FIGS. 3A and 3B illustrate the method 200 with reference to an initial attribute value range corresponding to a small cell basestation. However, in other examples, the initial attribute value range may be a smaller range corresponding to a single 3GPP class such as Home basestations or Local Area basestations.

In will be appreciated that many cell attributes are broadcast by basestations in SIBs, and other of these attributes may be used, alone or in combination with the common channel power setting to classify the basestation according to the method 200. For example, the downlink and uplink power advertised in the SIB could be combined to further enhance the classification process. The other attributes need not be power settings, and other broadcast SIB messages may be used, on the condition that the attributes broadcast may be used to classify basestations according to attribute value ranges that correspond to the different classes. For example, specific SIBs or information elements in SIBs may be defined for conveying cell attribute information. Presence or absence of such SIBs or information elements may convey information to the listening basestation 10 as well as the content and values of the information elements in the SIBs.

The method 200 illustrated in FIGS. 3A and 3B may be particularly advantageous in the event that no specific pool of identifiers is reserved for small cell basestation use in the network. In such situations, the method 100 of FIG. 2 cannot be fully completed, as the pool or set for comparison of neighbor identifier is not available. The method 200 of FIGS. 3A and 3B is not dependent upon such a network specific factor, as the basestation classes and their corresponding cell attribute value ranges are defined in standard documents prepared by the 3GPP or other standardizing bodies.

In addition, the method 200 of FIGS. 3A and 3B offers an additional level of classification granularity when compared with the method 100 of FIG. 2. While the combination of cell identifier and operating frequency of the method 100 offers a binary classification as small or macro layer cell. The method 200 offers another level of classification into Home, Local Area, Medium Area or Wide Area basestation classes. This additional classification information is dependent upon the basestation 10 being able to receive SIBs broadcast by the neighbor cell in question. Thus neighbor cells that are outside the detection range of the basestation 10, but may be detected by UEs connected to the basestation 10, may not be classified using the method 200 of FIGS. 3A and 3B. The measurements received from connected UEs typically include the information necessary to carry out the method 100 of FIG. 2, but do not include sufficient information to conduct the method 200 of FIGS. 3A and 3B.

In some embodiments of the present disclosure, the methods 100 and 200 of FIGS. 2, 3A and 3B may be combined, so providing increased flexibility and redundancy, ensuring that classification of neighbor cells can be conducted in different situations where more of less information may be available to the basestation 10.

Figure 4:
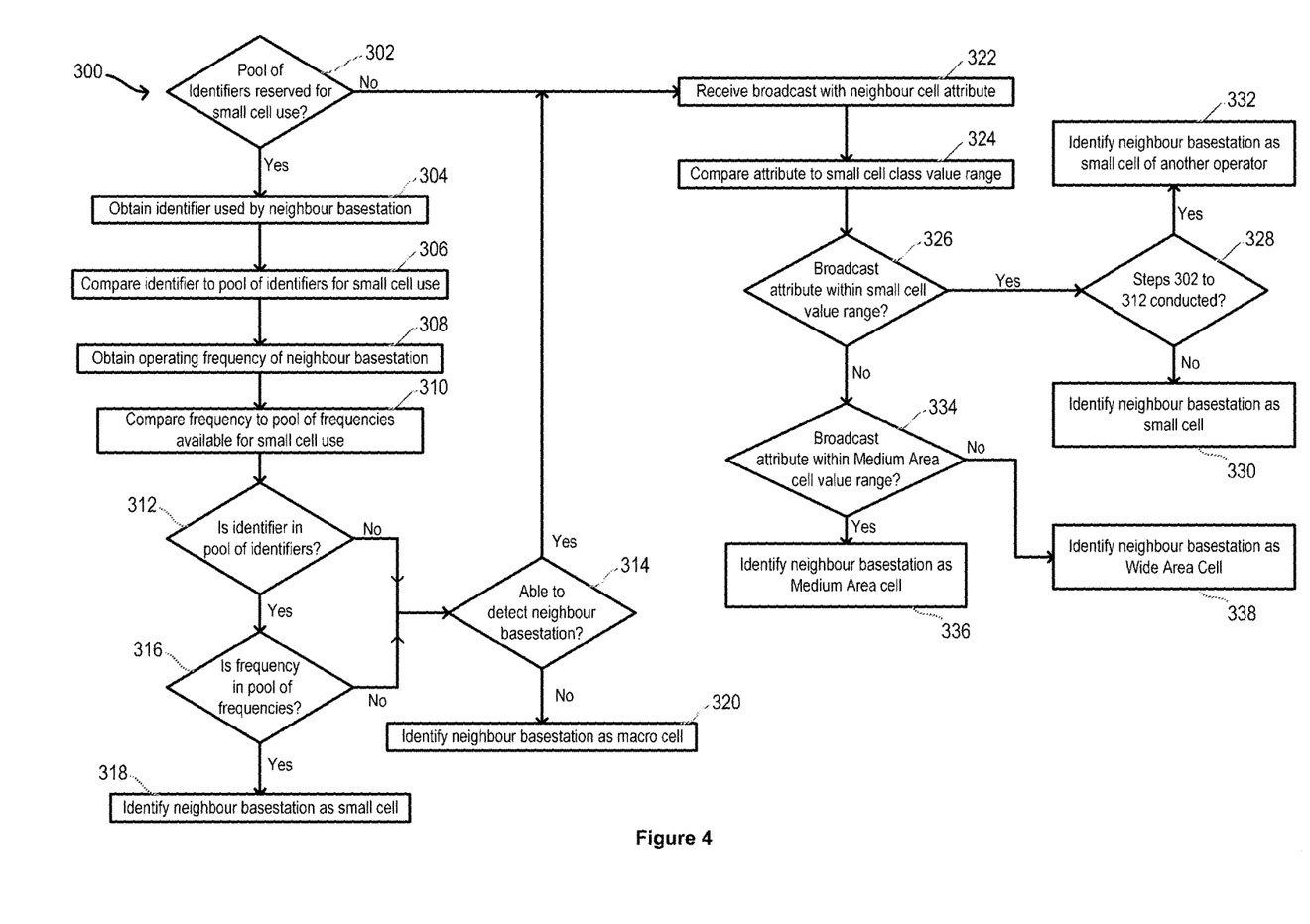
FIG. 4 is a flowchart illustrating one manner in which the methods of FIGS. 2, 3A and 3B may be combined.

FIG. 4 is a flowchart illustrating steps in a process 300 in which the methods 100 and 200 are combined. FIG. 4 illustrates merely one way in which the processes may be combined to provide increased detail and redundancy in the classification process.

Referring to FIG. 4, in a first step 302, the basestation 10 assesses whether or not a dedicated pool or set of identifiers has been reserved for small cell use in the network 2. If such a pool of dedicated identifiers exists (Yes in step 302), the basestation proceeds to follow substantially the initial steps of the method 100. The basestation 10 obtains an identifier of the neighbor basestation under consideration at step 304 and compares this identifier to the pool of identifiers reserved for small cell use in step 306. The basestation 10 then obtains an operating frequency of the neighbor basestation at step 308 and compares the operating frequency of the neighbor basestation to the pool of operating frequencies available for small cell use in the network 2 at step 310. The neighbor identifier and operating frequency may be obtained through NWL conducted by the basestation 10 or via measurement reports received from connected UEs.

In step 312, the basestation 10 assesses whether or not the identifier of the neighbor basestation was found to be in the pool of identifiers during the comparison of step 306. If the identifier was not in the pool of identifiers (No at step 312), the basestation 10 proceeds to step 314 as described below. If the identifier was in the pool of identifiers (Yes at step 312), the basestation 10 proceeds to assess, at step 316, whether or not the operating frequency of the neighbor basestation was found to be in the pool of frequencies during the comparison of step 310. If the operating frequency was not in the pool of frequencies (No at step 316), the basestation proceeds to step 314 as described below. If the operating frequency was found to be in the pool of frequencies (Yes in step 316), the basestation 10 classifies the neighbor basestation as a small cell basestation of its own network in step 318.

If either the cell identifier or operating frequency of the neighbor basestation does not fall within the appropriate pool, according to the method 100, the neighbor is classified as a macro cell. According to the method 300, the basestation first assesses, at step 314, whether it is able to detect the neighbor cell in question. If the basestation 10 cannot detect the neighbor cell, (and the previous steps were therefore conducted on the basis of received UE measurements), then the basestation 10 proceeds to classify the neighbor cell as a macro cell in step 320. In this situation, the basestation 10 is not able to receive the broadcast SIBs from the neighbor cell and cannot therefore conduct comparison of cell attributes with particular attribute value ranges in order to conduct further classification of the neighbor. If the basestation 10 can detect the neighbor basestation (Yes at step 314), then further classification may be possible, and the basestation 10 proceeds to step 322.

Returning to step 302, if a dedicated pool of identifiers for small cell use is not available (No at step 302), the basestation 10 proceeds directly to step 322. Step 322 and its subsequent steps may therefore be conducted as an alternative to steps 304 to 318, or as a complement to these steps, providing another level of classification.

In step 322, the basestation 10 receives a broadcast from the neighbor cell including a cell attribute of the neighbor cell. As discussed above, the cell attribute may for example be the common channel power setting for the neighbor cell. The basestation then compares the received cell attribute with a value range for the cell attribute corresponding to small cell basestations at step 324. In step 326, the basestation 10 assesses whether or not the received cell attribute of the neighbor basestation was found to fall within the small cell basestation attribute value range. If the attribute did fall within the small cell basestation value range (Yes at step 316), the basestation 10 then proceeds to check, in step 328, whether or not at least steps 302 to 312 have previously been conducted for the neighbor in question. If these steps have not been conducted (No in step 328), this indicates that the initial comparison based on identifier and frequency has not been carried out, and the basestation proceeds simply to classify the neighbor cell as a small cell basestation in step 330. If however, the steps 302 to 312 have been conducted, this indicates that the neighbor basestation has already been assessed on the basis of cell identifier and frequency and has been identified as not being a small cell belonging to the home network 2. The cell attribute assessment has indicated that the neighbor cell is a small cell so the basestation 10 proceeds to classify the neighbor cell as a small cell belonging to another network in step 332. The attribute comparison of steps 324 and 326 is based upon value ranges set by a standardizing body, and is thus not operator dependent, so allowing identification of small cells belonging to another operator.

If the cell attribute of the neighbor cell does not fall within the small cell attribute value range (No in step 326), the basestation proceeds to assess in step 334 whether or not the attribute falls within a value range corresponding to a Medium Area cell. If the attribute falls within the value range for a Medium Area cell, the basestation proceeds to classify the neighbor cell as a Medium Area cell in step 336. If the attribute does not fall within the value range for a Medium Area cell, the basestation 10 may proceed to classify the neighbor cell as a Wide Area cell in step 338. In an alternative arrangement (not shown), the basestation 10 may proceed with a comparison of the attribute against the attribute value range for a Wide Area cell. Such a comparison would permit a positive identification of a wide area cell or the identification of a neighbor cell that the basestation is unable to classify.

In further examples, the steps 324 and 326 of comparing the received attribute to a small cell attribute value range may be further subdivided to allow identification of Home and Local area cell classes. In such examples, following classification of a neighbor cell as a small cell at step 318, the method 300 may proceed to step 314 and subsequent steps if the neighbor can be detected, to enable a finer degree of classification of the small cell as either a Home cell or a Local Area cell. Appropriate additional checking steps may be added for example before classifying a cell as a small cell belonging to another network in step 332, in order to differentiate between refining of the classification of a home network small cell which has already been identified at step 318 and the identification of a small cell from another network.

The combined process 300 of FIG. 4 can be seen to be divided roughly into two parts, corresponding to the processes 100 and 200 of FIGS. 2, 3A and 3B. The first part (steps 302 to 320) offers a broad classification into small or macro cell types based upon neighbor cell identifier and operating frequency. The second part (steps 322 to 338) operates as a fall back option when a dedicated pool of identifiers for small cell use is not available. The second part also offers a finer grain of classification, identifying cells according to the 3GPP classes and also offering for example identification of neighbor small cells belonging to another network operator, through the combination of both identifier/frequency consideration and cell attribute consideration.

The possibility of identifying small cell basestations belonging to other networks offers particular advantages for the deployment of multiple small cells belonging to different vendors within the same area or site. Suitable RRM policies may be configured according to the different tiers in a network corresponding to the different vendors.

Figure 5:
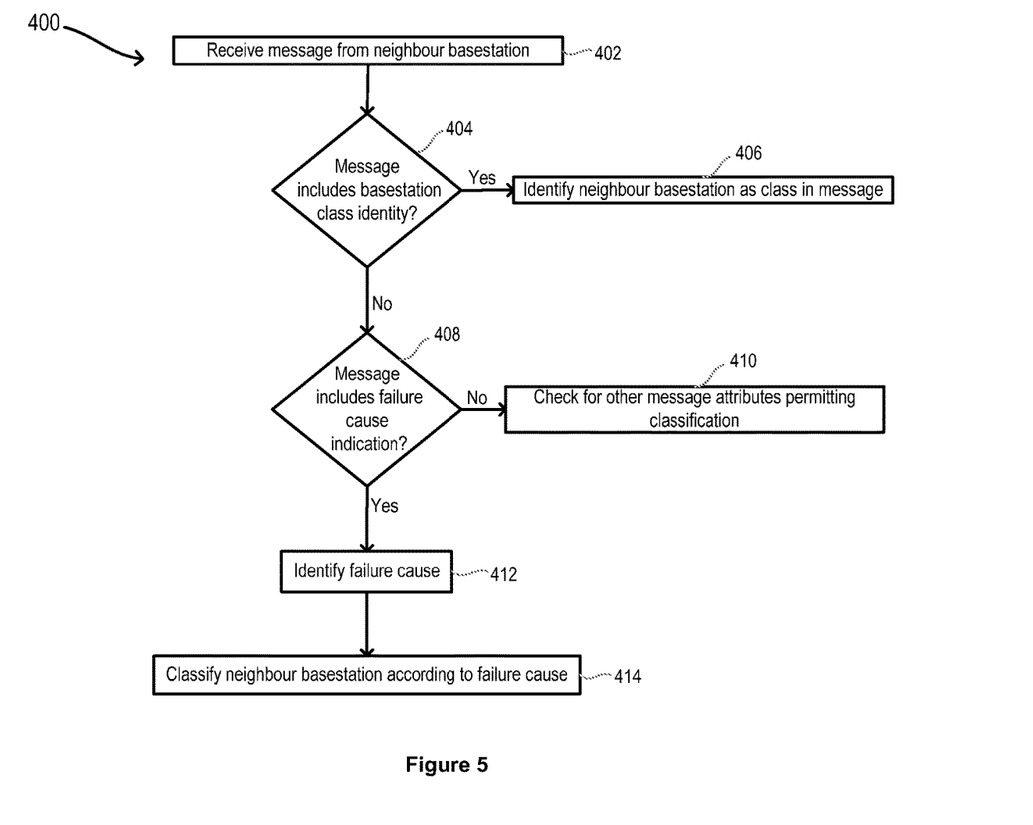
FIG. 5 is a flowchart illustrating steps in another method for classifying a basestation in a cellular communications network.

FIG. 5 is a flowchart illustrating steps in a process 400 according to another embodiment of the present disclosure by which the small cell basestation 10 may classify its neighbor basestations. As previously, the process steps are carried out with respect to a neighbor basestation, which the basestation 10 wishes to classify.

The method of FIG. 5 exploits information contained in signaling transactions between the basestation 10 and the relevant neighbor basestation in order to classify the neighbor basestation. Referring to FIG. 5, in a first step 402, the basestation 10 receives a message from the neighbor cell under consideration. The basestation 10 then checks, in step 404, whether or not the message includes an explicit indication of the class of the neighbor basestation. In some examples, message attributes may be defined for the explicit purpose of identifying the class of the sending basestation. If such attributes are present in the received message (Yes at step 404), the basestation 10 proceeds to classify the neighbor basestation into the class indicated in the received message at step 406.

If the received message does not contain an explicit indication of basestation class (No at step 404), the basestation 10 proceeds to check whether or not the message includes a cause of failure indication at step 408. A cause of failure indication may be included in a message received from a basestation following a failure in relocation or handover to the neighbor cell. If the message does not include a cause of failure indication (No at step 408), the basestation 10 proceeds to step 410, in which the basestation 10 checks the message content for other message attributes that may be associated with a particular basestation class, and so permit classification of the sending basestation. If the received message does include a cause of failure indication (Yes at step 408), the basestation 10 proceeds to identify the cause failure indication at step 412 and to classify the neighbor basestation according to the cause of failure indication at step 416.

Cause of failure indications are among a group of message attributes the contents of which may be associated with a particular basestation class. By identifying the cause of failure indicated in the received message, the basestation 10 may determine what class of basestation sent the message. For example, failure code X may be indicative of a small cell, while failure code Y is indicative of a macro layer cell. Failure codes tend to be global across a network and knowledge of the codes is required for functioning of the basestation 10, meaning a minimum of additional information is required for classification purposes. The lack of additional information required renders the method 400 of FIG. 5 desirable in that it is reliable, and may be performed regardless of availability of other classification information such as identifier pools etc. The method 400 is only initiated however when a signaling transaction takes place with a particular neighbor cell. There may therefore be a period of time before such a transaction takes place when the basestation 10 is unable to classify the neighbor cell. This time period may vary according to the nature of the deployment situation from for example a few minutes to a few days.

The order in which the process steps of FIG. 5 are conducted may vary according to a particular implementation. For example, the process may check for other message attributes permitting cell classification before checking whether or not the message includes a failure cause indication.

The process 400 of FIG. 5 may be run as an alternative to or in conjunction with either of the processes 100, 200 of FIGS. 2, 3A and 3B, or as an alternative to or in conjunction with the combined process 300 of FIG. 4. The process 400 of FIG. 5 may provide redundancy, allowing for classification to take place when information required for the processes 100 or 200 is not available. One way in which all three processes discussed above may be combined in a single unified process is illustrated in FIG. 6.

Figure 6:
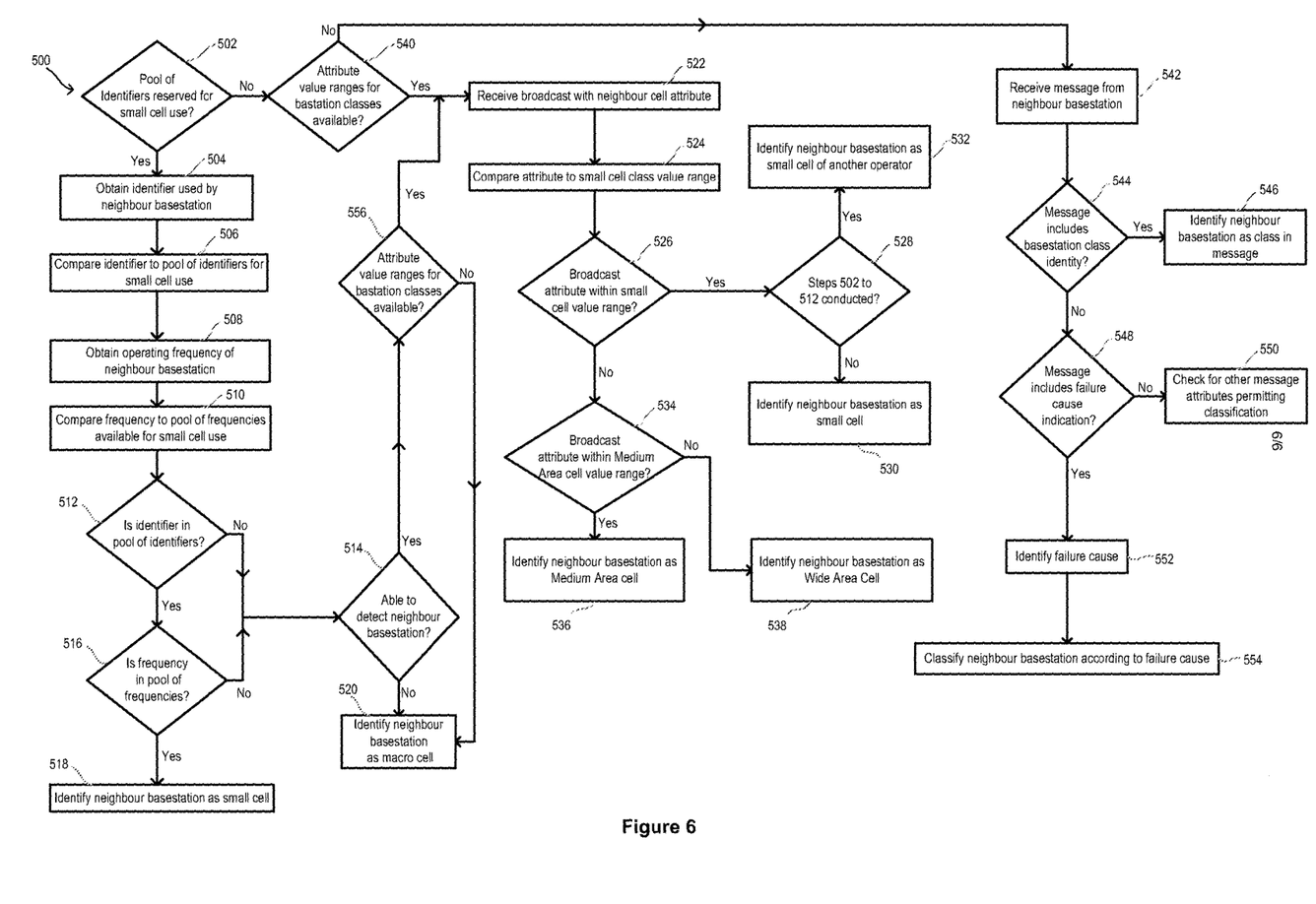
FIG. 6 is a flowchart illustrating one manner in which the methods of FIGS. 2, 3A and 3B and 5 may be combined.

FIG. 6 is a flowchart illustrating process steps in a method 500 according to another embodiment of the present disclosure by which a small cell basestation 10 may classify its neighbor basestations. As previously, the process steps are carried out with respect to a neighbor basestation, which the basestation 10 wishes to classify.

With reference to FIG. 6, steps 502 to 538 are essentially the same as steps 302 to 338 of the combined method 300 illustrated in FIG. 4. These steps are not discussed in detail here as a complete discussion of their operation is given above with reference to FIG. 4. Another step 540 is introduced to the process after determining that information concerning a pool of identifiers for small cell use is not available and before receipt of the broadcast SIB in step 522 (following a No at step 502 and before step 522). In step 540, before receiving the SIB broadcast, the basestation first checks whether or not attribute value ranges for the different basestation classes are available. If such value ranges are available (Yes at step 540), the basestation 10 proceeds to conduct steps 522 to 538 substantially as described above with reference to steps 322 to 338 of FIG. 4. If however the attribute value ranges are not available, the basestation 10 proceeds to conduct steps 542 to 554, which are substantially equivalent to steps 402 to 416 of the method 400 illustrated in FIG. 5. Thus in the absence both of information allowing classification based on identifier/frequency, and of information allowing classification based on broadcast cell attributes, the basestation 10 proceeds to await a signaling transaction with the neighbor cell (receipt of a message at step 542), in order to classify the cell based on the message attributes in the message received.

A further checking step 556 may be introduced after determining in step 514 that a neighbor basestation that is not a home network small cell can be detected by the basestation 10 (following a yes at step 514 and before step 522). In the step 556, the basestation 10 checks whether attribute value ranges for the different basestation classes are available before proceeding with the additional classification steps 522 following. If attribute value ranges are not available, the basestation 10 proceeds as for the case in which the basestation 10 cannot itself detect the neighbor, and classifies the neighbor as a macro cell in step 520.

The method 500 of FIG. 6 thus exploits the advantages of all three of the above-described processes, ensuring that classification may take place event when certain information is not available, and ensuring that classification is made to the finest granularity that is possible in the circumstances.

Aspects of the present disclosure thus enable a basestation to classify other neighboring basestations within its deployment area. According to certain embodiments of the disclosure, redundancy may be built into the processes for classification, enabling a basestation to classify its neighbors even when certain information useful to such processes is unavailable. In addition, different layers of classification may be identified, according to the process used and the information available.

A principal advantage of being able to classify neighbor basestations is the consequent ability to adapt and apply RRM policies based not only upon the observed radio conditions and number of cells in the deployment area but also upon the type of cells in the area. Thus, uplink and downlink power limits as well as handover and reselection policies may be applied with reference to the type of neighbor cells in the vicinity of the classifying basestation.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, a basestation, and/or a server. In some embodiments, one or more of these features may be implemented in hardware, provided external to these elements, or consolidated in any appropriate manner to achieve the intended functionality. The various network elements (e.g., basestation, server) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, a basestation and/or a server described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements of the basestation or server can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors of the basestation or server could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system of the FIGURES could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system of the FIGURES may be applicable to other exchanges or routing protocols. Moreover, although the communication system of the FIGURES has been illustrated with reference to particular elements and operations that facilitate the communication process, these elements, and operations may be replaced by any suitable architecture or process that achieves the intended functionality of the communication system of the FIGURES.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for classifying a basestation in a cellular communications network, comprising:
    obtaining an identifier used by the basestation, wherein the identifier is obtained by a first basestation of a first operator;
    comparing the identifier to a pool of identifiers reserved for a first class of basestations;
    obtaining a frequency on which the basestation is operating;
    comparing the frequency to a pool of frequencies used by the first class of basestations;
    receiving a broadcast from the basestation including a cell attribute of the basestation;
    comparing the cell attribute with a first attribute value range for the first class of basestations;
    identifying the basestation as belonging to the first class of basestations based on a determination that the identifier is in the pool of identifiers and the frequency is in the pool of frequencies, wherein the first class of basestations corresponds to small cell basestations of the first operator;
    identifying the basestation as belonging to a second class of basestations based on a determination that the cell attribute is within the first attribute value range and the identifier is not within the pool of identifiers, wherein the second class of basestations corresponds to small cell basestations of another operator;
    comparing the cell attribute to a second attribute range for a third class of basestations based on a determination that the cell attribute is not within the first attribute value range;
    identifying the basestation as belonging to the third class of basestations based on a determination that the cell attribute is not within the first attribute value range for the first class of basestations and that the cell attribute is within the second attribute range for the third class of basestations, wherein the third class of basestations corresponds to medium area macro cell basestations;
    identifying the basestation as belonging to a fourth class of basestations based on a determination that the cell attribute is not within the first attribute value range for the first class of basestations and that the cell attribute is not within the second attribute range for the third class of basestations, wherein the fourth class of basestations corresponds to wide area macro cell basestations;
forming one or more neighbor lists for the first basestation based on whether the basestation belongs to the first, the second, the third or the fourth class of basestations; and
adapting a Radio Resource Management (RRM) policy for the first basestation based on whether the basestation belongs to the first, the second, the third or the fourth class of basestations, wherein the RRM policy identifies uplink power limits, downlink power limits, a handover policy and a reselection policy for the first basestation.

2. A method as claimed in claim 1, wherein obtaining the identifier and frequency of the basestation further comprises receiving a broadcast from the basestation.

3. A method as claimed in claim 1, wherein obtaining the identifier and frequency of the basestation further comprises receiving measurements from a user equipment device.

4. A method as claimed in claim 3, wherein the cell attribute comprises a power setting.

5. A method as claimed in claim 4, wherein the cell attribute comprises a common channel power setting.

6. A method as claimed in claim 5, wherein the first attribute value range is defined by a cellular communications network operating standard.

7. A method as claimed in claim 6, further comprising
receiving a message from the basestation, wherein the message comprises message content;
analyzing the message content; and
identifying the basestation as belonging to a particular class of basestations based on the message content.

8. A method as claimed in claim 7, wherein the message includes an explicit indication of the particular class of the basestation and wherein identifying the basestation as belonging to the particular class of basestations based on the message content further comprises identifying the basestation as belonging to the particular class based on the explicit indication.

9. A method as claimed in claim 7, wherein the message includes content associated with the particular class of basestations and wherein identifying the basestation as belonging to the particular class of basestations based on the message content further comprises identifying the basestation as belonging to the particular class of basestations corresponding to the received message content.

10. A method as claimed in claim 9, wherein the message content comprises a cause of failure in a relocation or handover procedure.

11. A first basestation of a first operator, comprising:
a memory element for storing data; and
a processor for executing instructions associated with the data that, wherein the executing causes the first basestation to perform operations, comprising:
obtain an identifier used by another basestation, wherein the identifier is obtained by the first basestation;
compare the identifier to a pool of identifiers reserved for a first class of basestations;
obtain a frequency on which the other basestation is operating;
compare the frequency to a pool of frequencies used by the first class of basestations;
receive a broadcast from the other basestation including a cell attribute of the other basestation;
compare the cell attribute with a first attribute value range for the first class of basestations;
identify the other basestation as belonging to the first class of basestations based on a determination that the identifier is in the pool of identifiers and the frequency is in the pool of frequencies, wherein the first class of basestations corresponds to small cell basestations of the first operator;
identify the other basestation as belonging to a second class of basestations based on a determination the cell attribute is within the first attribute value range and the identifier is not within the pool of identifiers, wherein the second class of basestations corresponds to small cell basestations of another operator;
compare the cell attribute to a second attribute range for a third class of basestations based on a determination that the cell attribute is not within the first attribute value range;
identify the other basestation as belonging to the third class of basestations based on a determination that the cell attribute is not within the first attribute value range for the first class of basestations and the cell attribute is within the second attribute range for the third class of basestations;
identify the other basestation as belonging to a fourth class of basestations based on a determination that the cell attribute is not within the first attribute value range for the first class of basestations and the cell attribute is not within the second attribute range for the third class of basestations, wherein the fourth class of basestations corresponds to wide area macro basestations;
forming one or more neighbor lists for the first basestation based on whether the other basestation belongs to the first, the second, the third or the fourth class of basestations; and
adapting a Radio Resource Management (RRM) policy for the first basestation based on whether the other basestation belongs to the first, the second, the third or the fourth class of basestations, wherein the RRM policy identifies uplink power limits, downlink power limits, a handover policy and a reselection policy for the first basestation.

12. Non-transitory tangible media that includes instructions for execution by a processor, wherein the execution causes the processor to perform operations, comprising:
obtaining an identifier used by a basestation, wherein the identifier is obtained by a first basestation of a first operator;
comparing the identifier to a pool of identifiers reserved for a first class of basestations;
obtaining a frequency on which the basestation is operating;
comparing the frequency to a pool of frequencies used by the first class of basestations;
receiving a broadcast from the basestation including a cell attribute of the basestation;
comparing the cell attribute with a first attribute value range for the first class of basestations;
identifying the basestation as belonging to the first class of basestations based on a determination that the identifier is in the pool of identifiers and the frequency is in the pool of frequencies, wherein the first class of basestations corresponds to small cell basestations of the first operator;
identifying the basestation as belonging to a second class of basestations based on a determination that the cell attribute is within the first attribute value range and the identifier is not within the pool of identifiers, wherein the second class of basestations corresponds to small cell basestations of another operator;

comparing the cell attribute to a second attribute range for a third class of basestations based on a determination that the cell attribute is not within the first attribute value range;

identifying the basestation as belonging to the third class of basestations based on a determination that the cell attribute is not within the first attribute value range for the first class of basestations and the cell attribute is within the second attribute range for the third class of basestations, wherein the third class of basestations corresponds to medium area macro cell basestations;

identifying the basestation as belonging to a fourth class of basestations based on a determination that the cell attribute is not within the first attribute value range for the first class of basestations and the cell attribute is not within the second attribute range for the third class of basestations, wherein the fourth class of basestations corresponds to wide area macro cell basestations forming one or more neighbor lists for the first basestation based on whether the basestation belongs to the first, the second, the third or the fourth class of basestations; and adapting a Radio Resource Management (RRM) policy for the first basestation based on whether the basestation belongs to the first, the second, the third or the fourth class of basestations, wherein the RRM policy identifies uplink power limits, downlink power limits, a handover policy and a reselection policy for the first basestation.

13. The non-transitory tangible media as claimed in claim 12, wherein obtaining the identifier and frequency of the basestation further comprises receiving a broadcast from the basestation.

14. The non-transitory tangible media as claimed in claim 12, wherein obtaining the identifier and frequency of the basestation further comprises receiving measurements from a user equipment device.

15. The non-transitory tangible media as claimed in claim 14, wherein the cell attribute comprises a power setting.

16. The non-transitory tangible media as claimed in claim 15, wherein the cell attribute comprises a common channel power setting.

17. The non-transitory tangible media as claimed in claim 16, wherein the first attribute value range is defined by a cellular communications network operating standard.

18. The non-transitory tangible media as claimed in claim 17, wherein the execution causes the processor to perform further operations, comprising:
receiving a message from the basestation, wherein the message comprises message content;
analyzing the message content; and
identifying the basestation as belonging to a particular class of basestations based on the message content.

19. The non-transitory tangible media as claimed in claim 18, wherein the message includes an explicit indication of the particular class of the basestation and wherein identifying the basestation as belonging to the particular class of basestations based on the message content further comprises identifying the basestation as belonging to the particular class based on the explicit indication.

20. The non-transitory tangible media as claimed in claim 18, wherein the message includes content associated with the particular class of basestations and wherein identifying the basestation as belonging to the particular class of basestations based on the message content further comprises identifying the basestation as belonging to the particular class of basestations corresponding to the received message content.

* * * * *